United States Patent [19]

Hayashi et al.

[11] Patent Number: 5,057,380
[45] Date of Patent: Oct. 15, 1991

[54] SOFT MAGNETIC THIN FILMS OF ALLOYS OF FECONI OR FECODY AND LAMINATES COMPRISING ALTERNATE LAYERS OF FACE CENTERED CUBIC AND BODY CENTERED CUBIC CRYSTAL STRUCTURE

[75] Inventors: Kazuhiko Hayashi; Masatoshi Hayakawa; Kenji Katori; Koichi Aso, all of Kangawa, Japan

[73] Assignee: Sony Corporation, Tokyo, Japan

[21] Appl. No.: 212,183

[22] Filed: Jun. 27, 1988

[30] Foreign Application Priority Data

Jun. 30, 1987 [JP] Japan ................. 62-163593
Jun. 30, 1987 [JP] Japan ................. 62-163594

[51] Int. Cl.$^5$ ............................................. G11B 23/00
[52] U.S. Cl. .................................. 428/692; 428/694; 428/900; 428/611; 428/615
[58] Field of Search ............. 428/900, 692, 611, 615, 428/, 694

[56] References Cited

U.S. PATENT DOCUMENTS

| | | | |
|---|---|---|---|
| 3,739,358 | 7/1973 | Battarel | 365/87 |
| 4,195,323 | 3/1980 | Lee | 360/113 |
| 4,246,620 | 1/1981 | Kaminaka et al. | 360/127 |
| 4,422,117 | 12/1983 | Nomura et al. | 360/126 |
| 4,645,722 | 2/1987 | Katayama et al. | 428/694 |
| 4,661,216 | 4/1987 | Anderson et al. | 204/44.5 |
| 4,748,089 | 5/1988 | Kumasaka et al. | 428/635 |
| 4,814,921 | 3/1989 | Hamakawa et al. | 360/126 |
| 4,837,094 | 6/1989 | Kudo | 428/694 |

FOREIGN PATENT DOCUMENTS

| | | |
|---|---|---|
| 0147126 | 9/1982 | European Pat. Off. |
| 0206658 | 10/1984 | European Pat. Off. |
| 0234879 | 3/1986 | European Pat. Off. |
| 150516 | 8/1962 | Japan |

Primary Examiner—Merrell C. Cashion, Jr.
Assistant Examiner—Stevan A. Resan

[57] ABSTRACT

Disclosed is a soft magnetic thin film having a basic composition of FeCoNi or FeCoDy which is specified for use as a single layer film for increasing the saturation magnetic flux density and the coercive force.

The soft magnetic properties are achieved by laminating the above defined soft magnetic thin film as the first soft magnetic thin film layer with a second magnetic thin film layer. In this case, crystal structures of the first and the second soft magnetic thin films should appropriately be selected and combined.

5 Claims, 11 Drawing Sheets

SOFT MAGNETIC THIN FILMS OF ALLOYS OF FECONI OR FECODY AND LAMINATES COMPRISING ALTERNATE LAYERS OF FACE CENTERED CUBIC AND BODY CENTERED CUBIC CRYSTAL STRUCTURE

BACKGROUND OF THE INVENTION

1. Field of the Invention

This invention relates to a soft magnetic thin film and more particularly to a soft magnetic thin film used as the core of the magnetic head exhibiting satisfactory properties for high density recording.

2. Description of the Prior Art

In a magnetic recording/reproducing apparatus such as audio tape recorder or VTR (video tape recorder), the goal is a higher signal recording density and a higher recording quality. Metal tape using ferromagnetic metal powders such as iron powders and evaporated tape in which the ferromagnetic metal materials are directly deposited on the base film by physical vapor deposition, are used to attept to meet these goals.

In order to effect optimum recording and reproduction with full utilization of the properties of the magnetic recording medium having such high coercive force, it is necessary that the core material has a high saturation magnetic flux density and a low coercive force.

As the soft magnetic material satisfying such demand, various materials have so far been evolved and used as the sole layer or laminated layer.

The Fe-Co base alloy is one of the above materials and it has so far been attempted to add Si or other elements to obtain excellent soft magnetic properties. However, there is left sufficient room for study inconnection with optimization of the various conditions and the kind of the addition elements.

SUMMARY OF THE INVENTION

The present invention is aimed to provide improved soft magnetic properties of the Fe-Co base alloys and especially a soft magnetic thin film having good magnetic properties.

This invention provides a soft magnetic thin film used as the core etc. of the magnetic head, wherein the composition of the alloy having a basic composition of FeCoNi or FeCoDy is specified for use as a single layer film for increasing the saturation magnetic flux density and lowering the coercive force.

According to the present invention, better soft magnetic properties are achieved by laminating the above defined soft magnetic thin film as the first soft magnetic thin film layer with a second soft magnetic thin film layer.

In this case, crystal structures of the first and the second soft magnetic thin films should appropriately be selected and combined. When the first film has a face-centered cubic structure (i.e. FeCoNi) it should be laminated with the second film having a body-centered cubic structure. Inversely, the first film having a body-centered cubic structure (i.e. FeCoDy) should be combined with the second film having a face-centered cubic structure.

The soft magnetic thin film according to the present invention has a sufficiently low coercive force at the end of sputtering so that it does not impair the soft magnetic properties in the course of the heat processing such as the melting of glass when it is used as a single layer film for a magnetic head or the like.

When the soft magnetic thin film is used as the first soft magnetic thin film layer and laminated with the second soft magnetic thin film layer, soft magnetic properties are further improved.

When the soft magnetic thin film having these soft magnetic properties is used for the magnetic head, magnetization of the magnetic head is prevented and optimum recording and reproduction with only low distorsion and a high S/N ratio may be realized.

DETAILED DESCRIPTION OF THE INVENTION

The soft magnetic thin film of the present invention is proposed for achieving the above object, and is characterized in that it contains essentially Fe, Co and Ni and the composition range is 20 to 40 atomic percent for Fe, 15 to 55 atomic percent for Co and 20 to 55 atomic percent for Ni.

Figure 1:
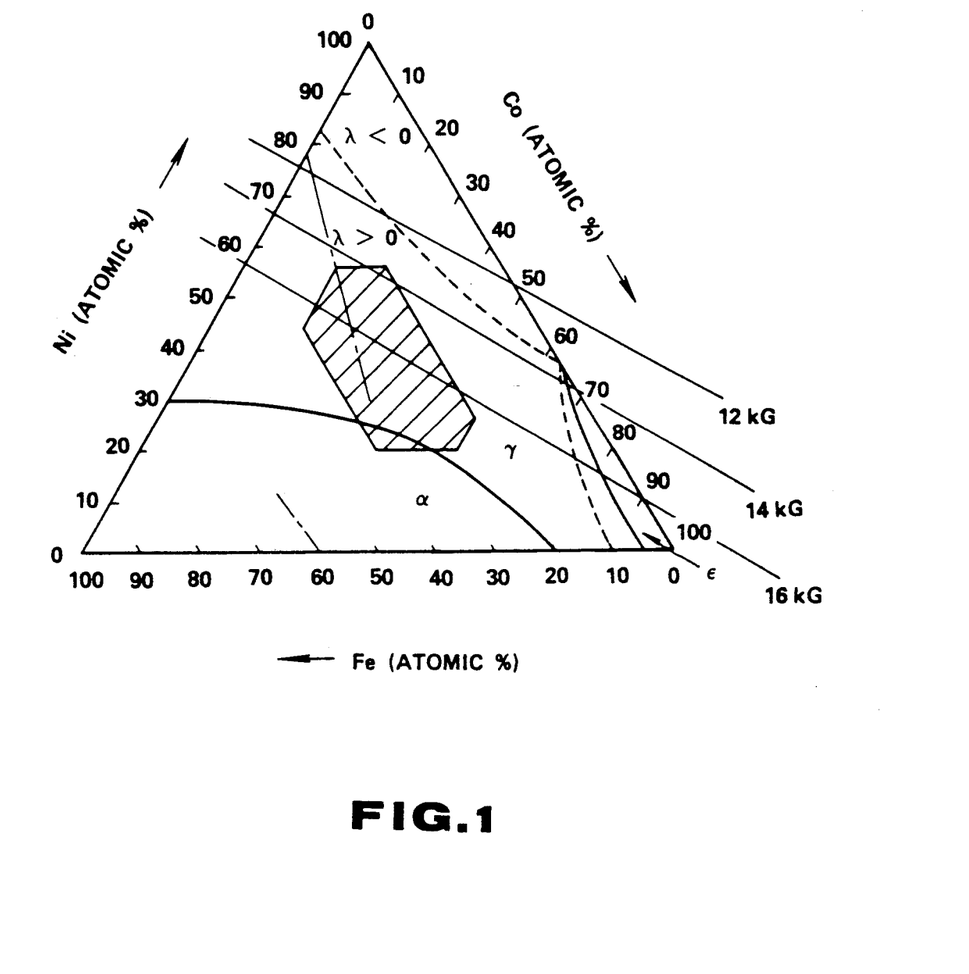
FIG. 1 is a ternary system diagram showing the composition range of the FeCoNi alloy according to the present invention.

FIG. 1 shows a ternary system diagram for the compositional range of the above FeCoNi base alloy. This alloy assumes an α-phase (body-centered cubic crystal), a γ-phase (face-centered cubic crystal) or an ε-phase (hexagonal phase), with the solid line in the drawing as the boundary, depending upon the contents of the respective elements. The dotted line in the drawing indicates the zeromagnetostriction curve, and the chain dotted line the zero crystal magnetoanisotropic curve. The composition range of the present invention corresponds to the hatched line area in the drawing and substantially assumes the face-centered cubic structure and a positive magnetostriction constant. It is an area for which high saturation magnetic flux density is expected.

Another soft magnetic thin film of the present invention is characterized in that it contains essentially Fe and/or Co and also contains 0.1 to 5 atomic percent of Dy.

The above composition range is specified from the standpoint of the soft magnetic properties and the soft magnetic properties are deteriorated outside of the composition range.

For improving corrosion- and wear- resistance, the above soft magnetic thin films may be admixed with up to 5 atomic percent of at least one of Ti, Zr, V, Nb, Ta, Cr, Mo, W, B, C, Si, Al, Fe and Ga as the fourth element.

The composition of the FeCoNi-base soft magnetic thin film including the fourth element is shown by the formula $Fe_aCo_bNi_cM_d$, wherein a, b, c and d denote the compositional ratio in atomic percent and M denotes the fourth element. The compositional range should satisfy the conditions $20 \leq a \leq 40$, $15 \leq b \leq 55$, $20 \leq C \leq 55$, $0 \leq d \leq 5$ and $a+b+c+d=100$.

The composition of the FeCoDy soft magnetic thin film including the fourth element is shown by the formula $Fe_aCo_bDy_cM_d$, wherein a, b, c and d denote the compositional ratio in atomic percent and M denotes the fourth element. The compositional range should satisfy the conditions $0 \leq b \leq 60$, $0.1 \leq C \leq 5$, $0 \leq D \leq 5$ and $a+b+c+d=100$.

The magnetic properties can be improved further by laminating the above soft magnetic thin films as the first soft magnetic thin film layer with the second soft magnetic soft film layer.

The single-layer film of the FeCoNi soft magnetic thin film mainly has the face-centered structure. It has been confirmed experimentally that more satisfactory properties may be obtained by laminating the layer with a magnetic thin film having a body-centered structure such as Fe, FeSi alloy, FeCoDy alloy, FeSiAl alloy, FeGaSi alloy, FeGaGe alloy or FeAlGe.

On the contrary the single-layer film of the FeCoDy soft magnetic thin film mainly has the body-centered structure. It has also been found that more satisfactory properties may be obtained by laminating the layer with a magnetic thin film having a face-centered structure such as the FeNi alloy or the FeCoNi alloy. The lamination of the thin films having different crystal structures is made to prevent the diffusion between the layers and to maintain a clear boundary after passing through various manufacture steps. The film thickness and the number of the laminated layers may be suitably selected in accordance with the desired magnetic properties.

These soft magnetic thin films can usually be produced by sputtering, for which various system such as high frequency magnetron sputtering, DC sputtering, counter target sputtering or ion beam sputtering may be employed under the usual conditions. When adding the above fourth element, an alloy of the addition element and the FeCoNi alloy or the FeCoDy alloy may be used as a target, or a sputtering may be performed with the chip of the addition element placed on a target consisting of the FeCoNi alloy or the FeCoDy alloy.

A preferred embodiment of the present invention will be explained further by referring to the accompanying drawings.

EXAMPLE 1

The relation between the composition of the FeCoNi thin film and the coercive force in the case of using the FeCoNi thin film as the single-layer film or as the laminated film with the FeSi thin film.

Figure 2:
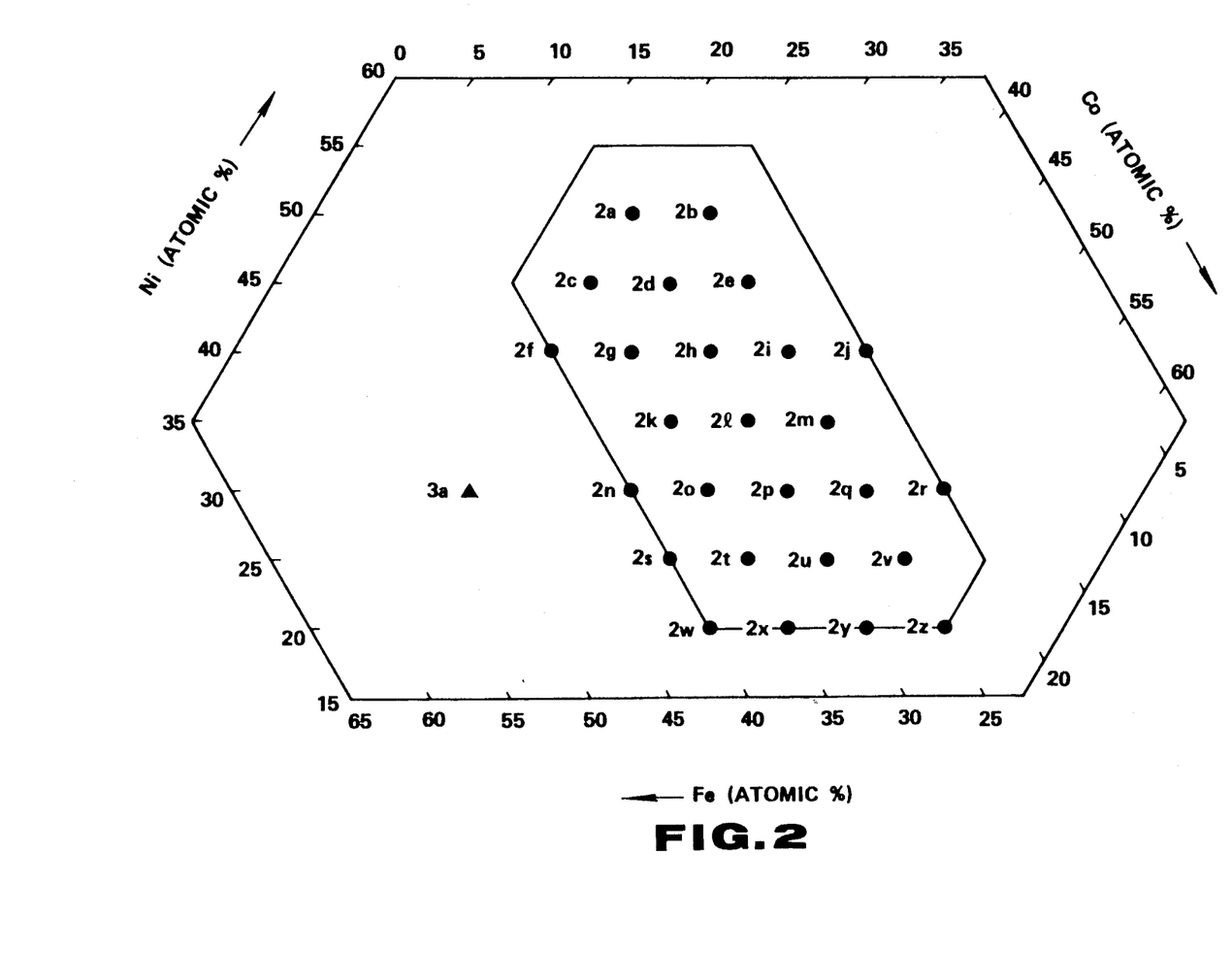
FIG. 2 is a ternary system diagram showing the composition of the coercive force measuring points of the single layer film and the laminated film of the FeCoNi thin film.

The FeCoNi alloys of various compositions have variable contents in the range of 20 to 40 atomic percent of Fe, 20 to 55 atomic percent of Co and 20 to 50 atomic percent of Ni. A single-layer film with a film thickness of 1.8 micron was formed using the FeCoNi alloy as the target, and the coercive force was measured. These single-layer films were used as the first soft magnetic thin films and alternately laminated with the second soft magnetic thin film layers having the high saturation magnetic flux density and the composition of $Fe_{86}Si_{14}$, the suffices indicating the composition in atomic percent, hereafter the same, so that the total film thickness is 1.8 micron and the number of layers for the two films is 80. The coercive force of the laminated film was measured. The results are shown in FIG. 2 and Table 1.

TABLE 1

| Point | Composition of single-layer film (atomic %) | | | coercive force of single-layer film | coercive force of laminated film |
|---|---|---|---|---|---|
| | Fe | Co | Ni | | |
| 2a | 30 | 20 | 50 | 0.37 | 0.17 |
| 2b | 25 | 25 | 50 | 0.32 | 0.18 |
| 2c | 35 | 20 | 45 | 0.37 | 0.51 |
| 2d | 30 | 25 | 45 | 0.40 | 0.57 |
| 2e | 25 | 30 | 45 | 0.42 | 0.20 |
| 2f | 40 | 20 | 40 | 0.52 | 0.25 |
| 2g | 35 | 25 | 40 | 0.41 | 0.17 |
| 2h | 30 | 30 | 40 | 0.42 | 0.19 |
| 2i | 25 | 35 | 40 | 0.49 | 0.23 |
| 2j | 20 | 40 | 40 | 0.50 | 0.22 |
| 2k | 35 | 30 | 35 | 0.52 | 0.14 |
| 2l | 30 | 35 | 35 | 0.41 | 0.19 |
| 2m | 25 | 40 | 35 | 0.51 | 0.20 |
| 2n | 40 | 30 | 30 | 6.5 | 0.64 |
| 2o | 35 | 35 | 30 | 0.41 | 0.18 |
| 2p | 30 | 40 | 30 | 0.42 | 0.16 |
| 2q | 25 | 45 | 30 | 0.56 | 0.20 |
| 2r | 20 | 50 | 30 | 0.83 | 0.44 |
| 2s | 40 | 35 | 25 | 3.81 | 0.91 |
| 2t | 35 | 40 | 25 | 3.22 | 0.88 |
| 2u | 30 | 45 | 25 | 0.58 | 0.22 |
| 2v | 25 | 50 | 25 | 0.70 | 0.28 |

TABLE 1-continued

| Point | Composition of single-layer film (atomic %) | | | coercive force of single-layer film | coercive force of laminated film |
|---|---|---|---|---|---|
| | Fe | Co | Ni | | |
| 2w | 40 | 40 | 20 | 4.21 | 1.80 |
| 2x | 35 | 45 | 20 | 2.38 | 0.92 |
| 2y | 30 | 50 | 20 | 1.78 | 0.70 |
| 2z | 25 | 55 | 20 | 1.63 | 0.81 |
| 3a | 50 | 20 | 30 | 8.3 | 2.26 |

FIG. 2 corresponds to the hatched line area and the vicinity of FIG. 1 shown to an enlarged scale. The respective points indicated by marks correspond to the composition of the respective soft magnetic thin film as measured and are indicated by symbols 2a to 2Z.

Table 1 shows the coercive forces of the single-layer film and the laminated film thereof with the $Fe_{86}Si_{14}$ thin film, in association with the respective points shown in FIG. 2.

It is seen from the figure and the table that the coercive force of the single layer film is sufficiently low and 0.32 to 6.5 (Oe) while that of the laminated film is lower and 0.14 to 1.8 (Oe).

As a comparative example, FIG. 2 shows an example of the soft magnetic thin film outside the range of the composition defined in the present invention by marks ▲ (point 3a). This soft magnetic thin film has a composition $Fe_{50}Co_{20}Ni_{30}$ with the Fe contents exceeding the range defined in the present invention. The coercive force of the soft magnetic thin film is 8.3 (Oe) for the single-layer film and 2.26 (Oe) for the laminated film, both of these values being much lower than the value of the soft magnetic thin film belonging to the above composition range.

Figures 3A, 3B:
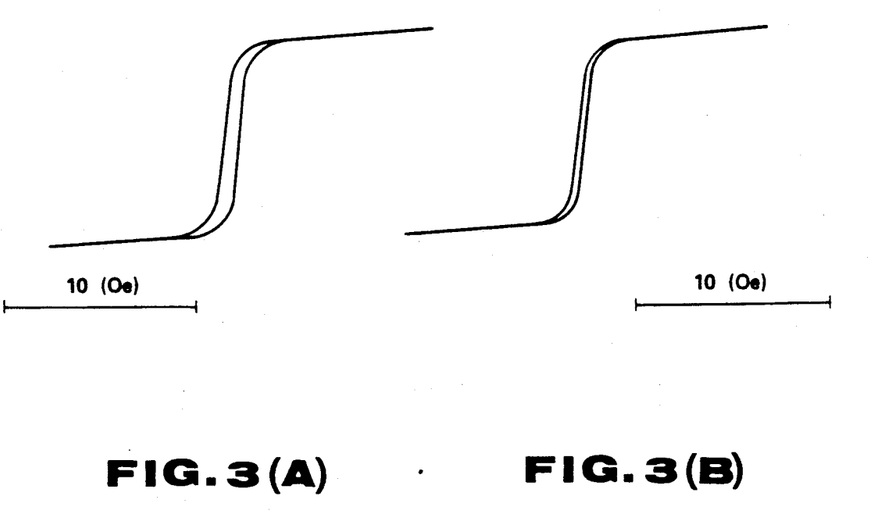
FIGS. 3(A) and 3(B) are characteristic diagrams showing hysteresis curves for the single layer and laminated films of $Fe_{30}Co_{40}Ni_{30}$ thin film, FIG. 3(A) corresponding to the single-layer film and FIG. 3(B) to the laminated film with the $Fe_{86}Si_{14}$ thin film.

As examples of the soft magnetic thin film pertaining to the present invention, the hysteresis curves for the single layer and laminated films of the soft magnetic thin films pertaining to the present invention are shown for comparison sake in FIGS. 3(A) and 3(B). FIG. 3(A) corresponds to the single layer and FIG. 3(B) to the laminated film. The single-layer film is 1.8 micron thick, while the laminated film is composed of 180 layers each of thin films of $Fe_{30}Co_{40}Ni_{30}$ 55 Å thick and $Fe_{86}Si_{14}$ 47 Å thick, these films being laminated alternately to a total thickness of 1.84 micron. Despite certain differences, the laminated film is similar to the soft magnetic thin film shown at point 2p in FIG. 2. By comparing the single layer film and the laminated film, it is seen that the coercive force is improved in the laminated film without deteriorating the saturation magnetic flux density.

As concrete examples of the soft magnetic thin film, soft magnetic thin films (I) to (VI) were prepared and the specific electric resistance and the magneto resistance effect were investigated. The results are shown in Table 2, wherein the soft magnetic thin film (I), (III), and (V) are single layer films and the soft magnetic thin films (II), (IV) and (VI) are laminated films obtained by laminating 180 of these single-layer films with 180 of the $Fe_{86}Si_{14}$ thin films alternately. The single layer films were each about 1.8 micron thick, whereas each layer of the laminated film was about 50 Å, the total thickness being about 1.8 micron. These two films could be compared with each other despite certain differences and correspond roughly to FIG. 2. For example, the soft magnetic thin films (I), (II) are similar to point 2a in FIG. 2, the soft magnetic thin films (III) and (IV) to point 2j in FIG. 2 and the soft magnetic thin films (V), (VI) to point 2o in FIG. 2

TABLE 2

| soft magnetic thin film | composition (thickness) | | total thickness (μm) | specific electric resistance $\rho o$ (μΩ cm) | magneto-resistance effect $\Delta\rho/\rho o$ (%) | coercive force (Oe) |
|---|---|---|---|---|---|---|
| | FeCoNi (Å) | FeSi (Å) | | | | |
| I | $Fe_{30}Co_{20}Ni_{50}$(50) | $Fe_{86}Si_{14}$(48) | 1.77 | 58.9 | 0.71 | 0.15 |
| II | $Fe_{30}Co_{20}Ni_{50}$ | — | 1.79 | 26.2 | 1.74 | 0.30 |
| III | $Fe_{20}Co_{40}Ni_{40}$(54) | $Fe_{86}Si_{14}$(47) | 1.81 | 52.1 | 0.93 | 0.18 |
| IV | $Fe_{10}Co_{40}Ni_{40}$ | — | 1.95 | 22.3 | 2.33 | 0.54 |
| V | $Fe_{35}Co_{35}Ni_{30}$(54) | $Fe_{86}Si_{14}$(45) | 1.79 | 55.7 | 0.71 | 0.17 |
| VI | $Fe_{35}Co_{35}Ni_{30}$ | — | 1.96 | 26.9 | 1.58 | 0.33 |

It is seen from this Table that the corresponding laminated film has a specific resistance twice higher than the single layer film and an advantage is derived as to the core loss. It is also seen that a sufficiently low coercive force is attained in the single layer film, but further improvement is realized in the laminated film.

The crystallographic properties of the FeCoNi base thin film, FeSi base thin film and the laminated films of these films were investigated. Using variable film thicknesses of the $Fe_{30}Co_{40}Ni_{30}$ and $Fe_{86}Si_{14}$, single-layer films and laminated films of substantially the same total thickness were prepared, and subjected to X-ray crystal diffraction upon termination of sputtering and upon termination of annealing for one hour at 350 oC. The results are shown in Table 3.

TABLE 3

| | $Fe_{86}Si_{14}$ single-layer film 1.7 μm | | | $Fe_{30}Co_{40}Ni_{30}$ (66Å) $Fe_{86}Si_{14}$ (22Å) 200 layers each total thickness 1.76 μm | | | $Fe_{30}Co_{40}Ni_{30}$ (47Å) $Fe_{86}Si_{14}$ (54Å) 180 layers each total thickness 1.86 μm | | | $Fe_{30}Co_{40}Ni_{30}$ (19Å) $Fe_{86}Si_{14}$ (76Å) 200 layers each total thickness 1.90 μm | | | $Fe_{30}Co_{40}Ni_{30}$ single-layer film 1.9 μm | | |
|---|---|---|---|---|---|---|---|---|---|---|---|---|---|---|---|
| | hkl | 2θ | I | hkl | 2θ | I | hkl | 2θ | I | hkl | 2θ | I | hkl | 2θ | I |
| after sputtering | *— | 25.5 | 17 | F*100 | 17.0 | 21 | F*100 | 17.0 | 20 | F 111 | 51.8 | 160 | F 111 | 51.7 | 204 |
| | B 110 | 52.3 | 606 | F*110 | 25.8 | 53 | F*110 | 25.8 | 5 | F 200 | 59.8 | 24 | F 200 | 60.7 | 45 |
| | B 211 | 99.8 | 14 | B 110 | 52.5 | 8700 | B 110 | 52.3 | 840 | F 220 | 91.0 | trace | F 220 | 90.7 | 27 |
| | | | | | | | | | | | | | F 311 | 113.3 | 24 |
| after annealing | B 110 | 52.6 | 920 | F*100 | 17.1 | 24 | F*100 | 17.1 | 22 | F 111 | 51.6 | 240 | F 111 | 51.6 | 284 |
| | B 211 | 100.3 | 18 | F*110 | 25.7 | 60 | F*110 | 25.7 | 40 | B 110 | 52.6 | 192 | F 200 | 60.5 | 63 |
| | | | | B 110 | 52.5 | 12400 | B 110 | 52.4 | 3280 | F 200 | 59.9 | 29 | F 220 | 90.6 | 35 |

TABLE 3-continued

| $Fe_{86}Si_{14}$ single-layer film 1.7 μm | | | $Fe_{30}Co_{40}Ni_{30}$ (66Å) $Fe_{86}Si_{14}$ (22Å) 200 layers each total thickness 1.76 μm | | | $Fe_{30}Co_{40}Ni_{30}$ (47Å) $Fe_{86}Si_{14}$ (54Å) 180 layers each total thickness 1.86 μm | | | $Fe_{30}Co_{40}Ni_{30}$ (19Å) $Fe_{86}Si_{14}$ (76Å) 200 layers each total thickness 1.90 μm | | | $Fe_{30}Co_{40}Ni_{30}$ single-layer film 1.9 μm | | |
|---|---|---|---|---|---|---|---|---|---|---|---|---|---|---|
| hkl | 2θ | I | hkl | 2θ | I | hkl | 2θ | I | hkl | 2θ | I | hkl | 2θ | I |
| | | | B 211 | 100.5 | 9 | | | | B 200 | 77.6 | 23 | F 311 | 113.1 | 28 |
| | | | | | | | | | B 211 | 100.2 | 19 | | | |

In the Table, hkl denotes crystal surface indices, 2θ the diffraction angle and I the relative strength. Among the symbols entered in the columns of the crystal surface indices, F denotes the face-centered cubic structure, B the body-centered cubic structure and * the ordered lattice. The total thicknesses of the single-layer film or the laminated film and the component film thickness and the number of layers in the case of the laminated films, are as shown in the Table. It is seen from the Table that the $Fe_{86}Si_{14}$ layers film has a body-centered cubic structure while the $Fe_{30}Co_{40}Ni_{30}$ has a face-centered cubic structure and the laminated film contains both of these structures, with one of the crystal structures dominating according to the film thicknesses of the respective layers. This tendency becomes more pronounced after annealing than after sputtering.

Figure 4A:
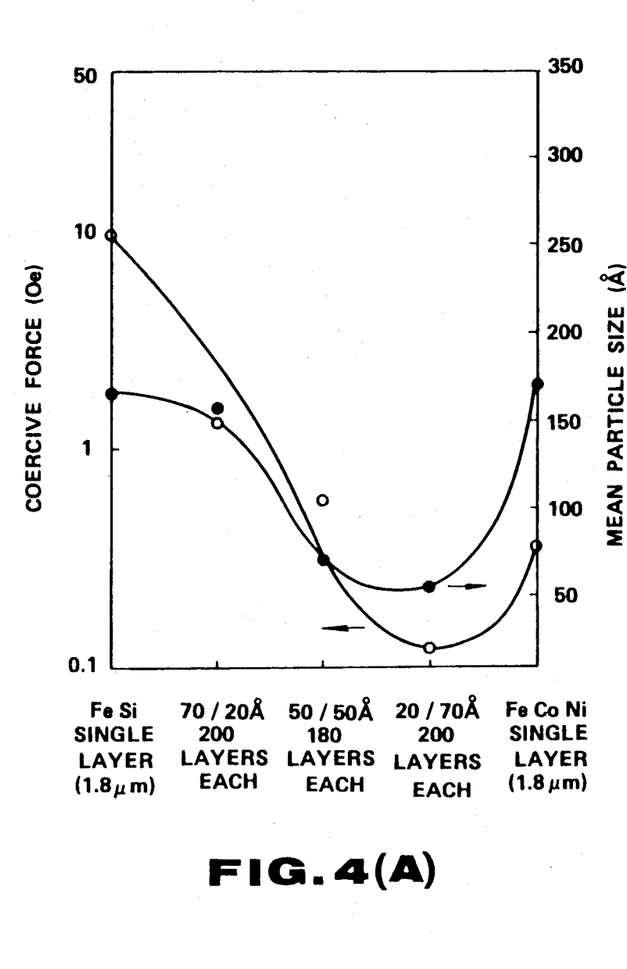
FIGS. 4(A) and 4(B) are characteristic diagrams showing the film thickness dependency of the mean particle size and the coercive force in the laminated film of the $Fe_{30}Co_{40}Ni_{30}$ thin film and the $Fe_{86}Si_{14}$ thin film, FIG. 4(A) corresponding to the characteristics after sputtering and FIG. 4(B) to those after annealing.
Figure 4B:
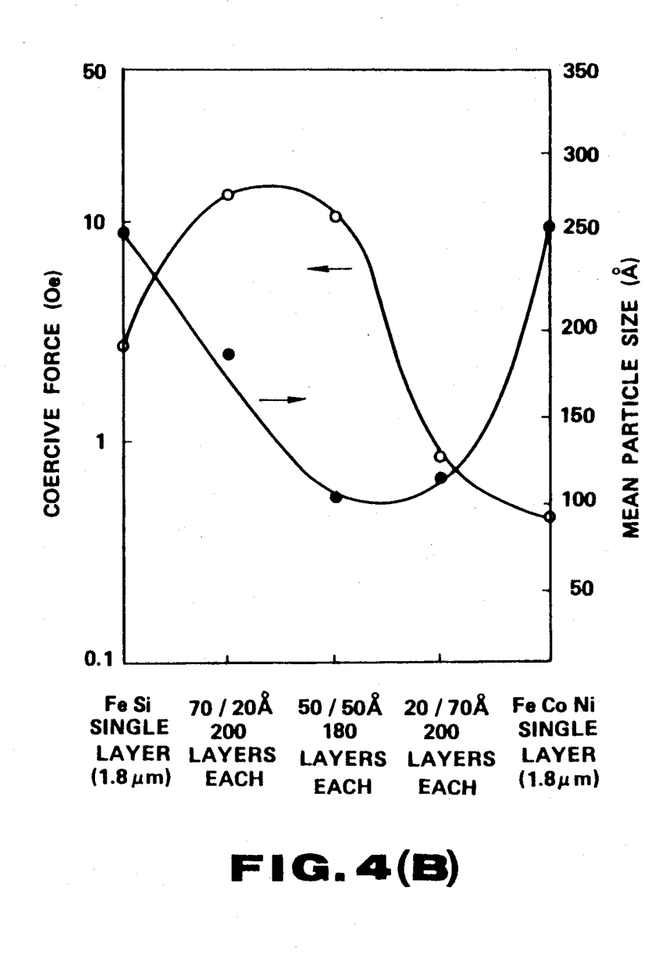

The phenomenon that the crystal structure is changed by such annealing is also seen from the mean particle size data shown in FIGS. 4(A) and 4(B). These figures show the mean particle size (symbol ●) of the single-layer film and the laminated film having the game composition as above and the substantially approximate film thickness and the coercive force (symbol ○), FIG. 4(A) showing the properties after sputtering and FIG. 4(B) those rafter annealing.

Referring first to FIG. 4(A), both the mean particle size and the coercive force tend to be changed so as to exhibit minimum values in dependence upon the combination of the film thicknesses. It is the soft magnetic thin films obtained upon laminating the $Fe_{86}Si_{14}$ film of 20 Å and $Fe_{30}Co_{40}Ni_{30}$ of 70 Å that exhibits the minimum coercive force after sputtering, this soft magnetic thin film also having the smallest mean particle size.

Referring to FIG. 4(B), the mean particle size is increased after annealing as it is with the tendency to exhibit the minimum value in dependence upon the combination of film thicknesses, while the coercive force tends to be changed to have a maximum value.

Figure 5:
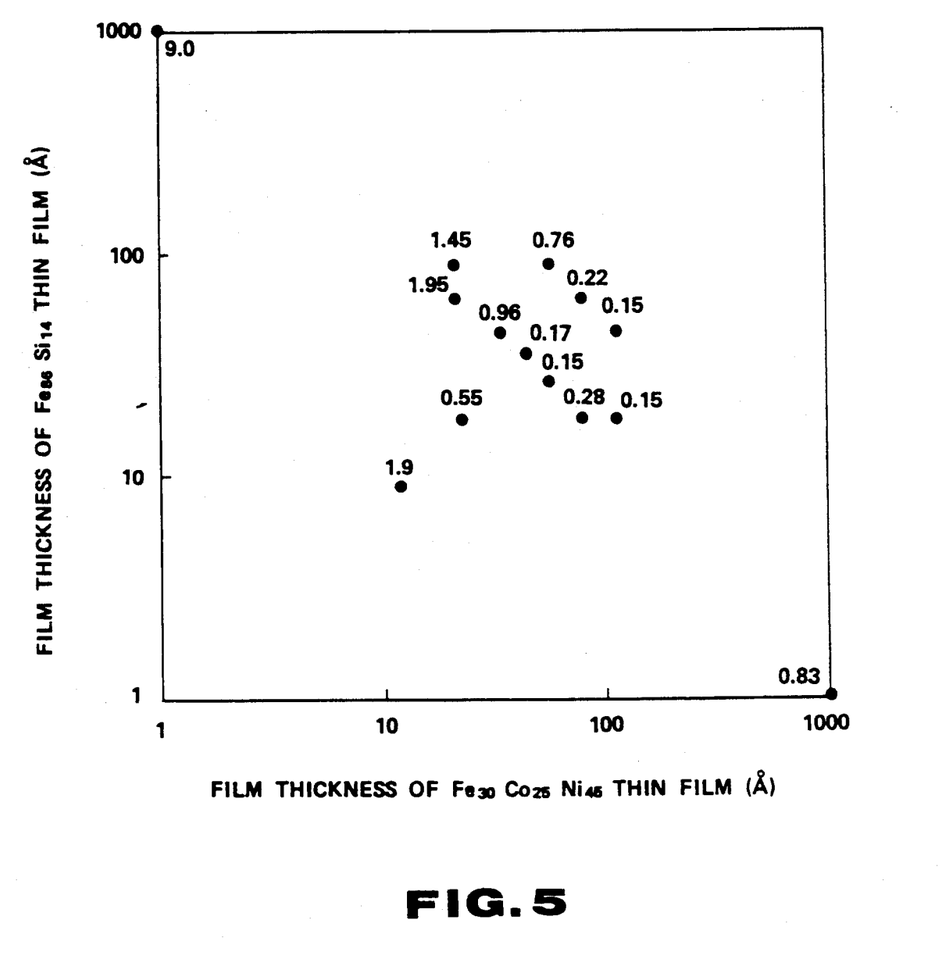
FIG. 5 is a characteristic diagram showing the film thickness dependency of the coercive force of the laminated film of the $Fe_{30}Co_{25}Ni_{45}$ thin film and the $Fe_{86}Si_{14}$ thin film.

The relation between the coercive force and the combination of film thicknesses of various layers of the laminated film was then examined. Thus the $F_{30}Co_{25}Ni_{45}$ thin film and the $Fe_{86}Si_{14}$ thin film were laminated while the various film thickness combination were used and the coercive force was measured after the end of sputtering. FIG. 5 shows the film thickness combinations. The measured values of the coercive force are indicated above the respective points in the drawing. During sputtering, the gas pressure was 2.5 m Torr and the total thickness was 1.8 microns.

It is seen from this figure that the produced soft magnetic thin films all had low coercive force and that generally the soft magnetic thin film with a larger film thickness of the $Fe_{30}Co_{25}Ni_{45}$ thin film tend to have a lower coercive force than the $Fe_{86}Si_{14}$ thin film.

In the above, explanation has been made with reference to experiments on the FeCoNi single thin film and the laminated film thereof with the FeSi thin film, in connection with the drawings and tables. The laminated film of a film other than the FeSi thin film has also been examined.

Figure 6:
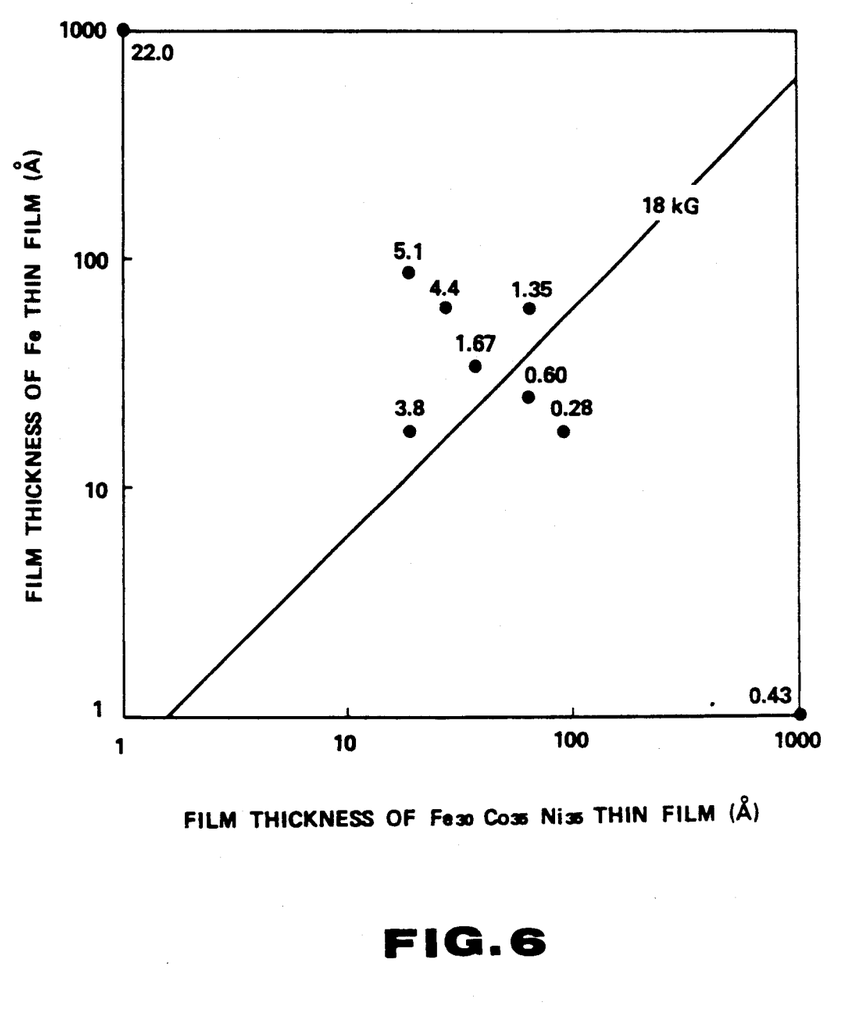
FIG. 6 is a characteristic diagram showing the film thickness dependency of the coercive force of the laminated film of the $Fe_{30}Co_{35}Ni_{35}$ thin film and the Fe thin film.

First of all, the $Fe_{30}Co_{35}Ni_{35}$ thin film was laminated with Fe thin film with various film thickness combinations and the coercive force was measured at the end of sputtering. These film thickness combinations are shown in FIG. 6, wherein the measured values of the coercive force are entered above the respective points. During sputtering, the gas pressure was 2.5 m Torr and the total thickness was 1.8 microns.

It is seen from this figure that the soft magnetic thin film with a larger film thickness of the $Fe_{30}Co_{25}Ni_{45}$ thin film tend to show a lower coercive force than in the Fe thin film, but the coercive force is generally higher than in the soft magnetic thin film in FIG. 5.

Figure 7:
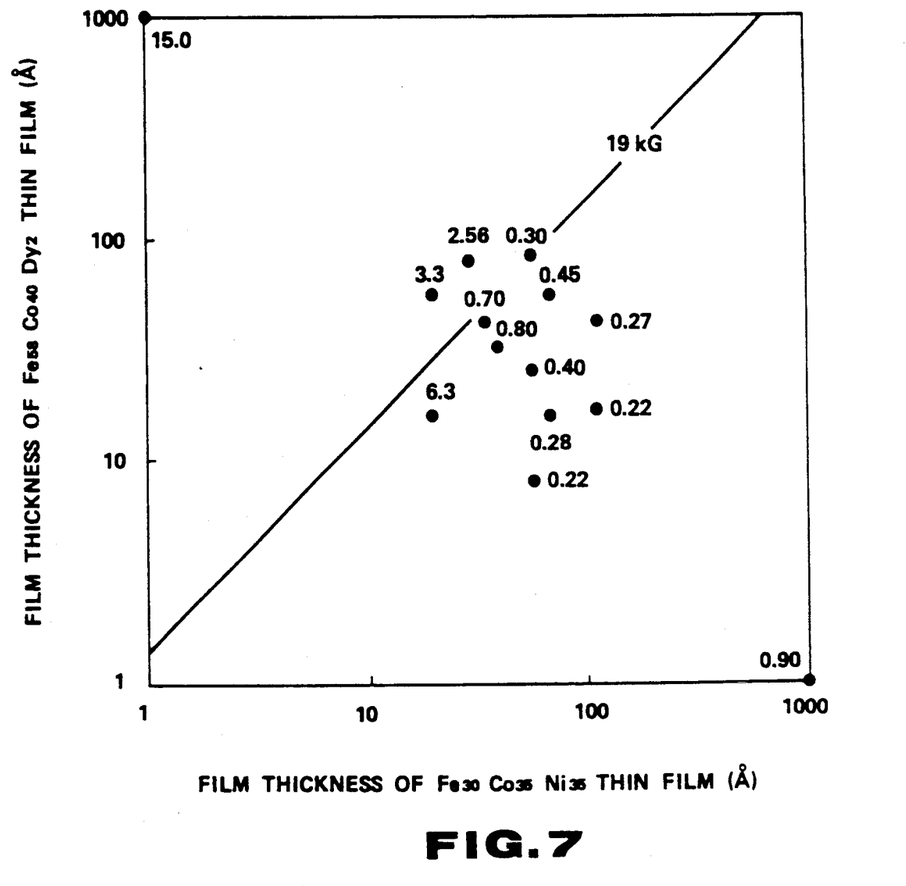
FIG. 7 is a characteristic diagram showing the film thickness dependency of the coercive force of the laminated film of the $Fe_{30}Co_{35}Ni_{35}$ thin film and the $Fe_{58}Co_{40}Dy_2$ thin film.

Secondly, an example of laminating the thin film of $Fe_{58}Co_{40}Dy_2$ with the thin film of $Fe_{58}Co_{40}Dy_2$. The laminated films were produced using variable combinations of the film thicknesses and the coercive force was measured after sputtering. The film thickness combinations are shown in FIG. 7, wherein the measured values of the coercive force are entered on the points in the figure. The gas pressure during sputtering was 2.5 m Torr and the total laminated thickness was 1.8 micron.

It is seen from this figure that the soft magnetic thin film with larger film thickness of the $Fe_{30}Co_{25}Ni_{45}$ thin film generally has a coercive force lower than that of the $Fe_{58}Co_{40}Dy_2$ thin film and, in general, has a coercive force intermediate between that of the soft magnetic thin film of FIG. 5 and that of the soft magnetic thin film of FIG. 6.

In the above examples, addition elements are not contained in the FeCoNi thin film. An example of investigating into magnetic properties of a laminated film employing the FeCoNi thin film admixed with B and Ti as the fourth element is explained.

Figure 8A:
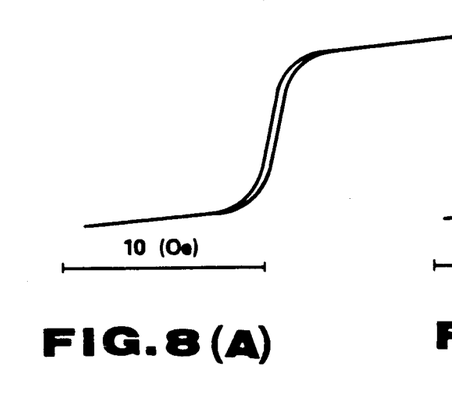
FIGS. 8(A) and 8(B) are characteristic diagrams showing hysteresis curves of the laminated films of the FeCoNi thin film admixed with the fourth element and the $Fe_{86}Si_{14}$ thin film, FIG. 8(A) corresponding to the case of admixing the film with B and FIG. 8 (B) to the case of admixing the film with Ti.
Figure 8B:
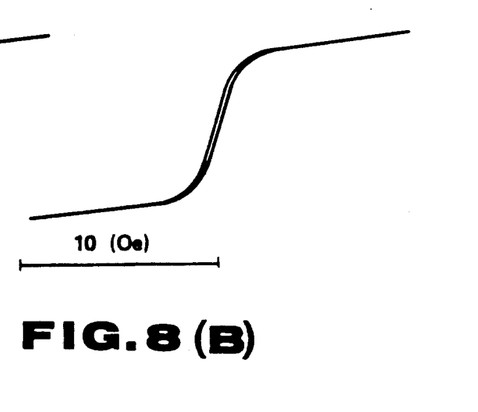

In FIG. 8(A), there is shown a hysteresis curve after sputtering of a laminated type soft magnetic thin film obtained upon alternately laminating each 180 layers of the $Fe_{29}Co_{40}Ni_{29}B_2$ thin films 55 Å thick and the $Fe_{86}Si_{14}$ thin films 45 Å thick, with total thickness being 1.8 micron, while in FIG. 8(B), there is shown a hysteresis curve after sputtering of a laminated type soft magnetic thin film obtained upon alternately laminating each 180 layers of the $Fe_{29}Co_{40}Ni_{20}Ti_2$ thin layer 43 Å thick and the $Fe_{86}Ni_{14}$ thin films 47 Å thick, with the total thickness being 1.8 micron.

It is seen from these figures that each of these laminated films has a sufficiently low coercive force and especially the addition of Ti is effective to reduce the coercive force, but on comparing with FIG. 3(B), the saturation magnetic flux density is decreased in each case.

EXAMPLE 2

For investigating the effect of addition of Dy to the FeCo film, the thin film of $Fe_{60}Co_{40}$ (the numerical figures represent the composition in atomic percent; hereafter the same), the $Fe_{60}Co_{38}Dy_2$ thin film and, as a comparative example, the thin film admixed with Sm belonging to the lanthanoid system as does Dy ($Fe_{60}Co_{38}Sm_2$ thin film) were prepared with film thickness of 2 microns each, and the soft magnetic properties at the end of sputtering and annealing (450° C., one hour) were measured. The results for the $Fe_{60}Co_{40}$ thin film are shown at (A) and (B) in FIG. 9, those for the $Fe_{60}Co_{38}Sm_2$ are shown at (A) and (B) in FIG. 10 and those for $Fe_{60}Co_{38}Sm_2$ are shown at (A) and B in FIG. 11. In these figures, (A) and (B) denote the properties at the end of sputtering and annealing, respectively.

Figure 9A:
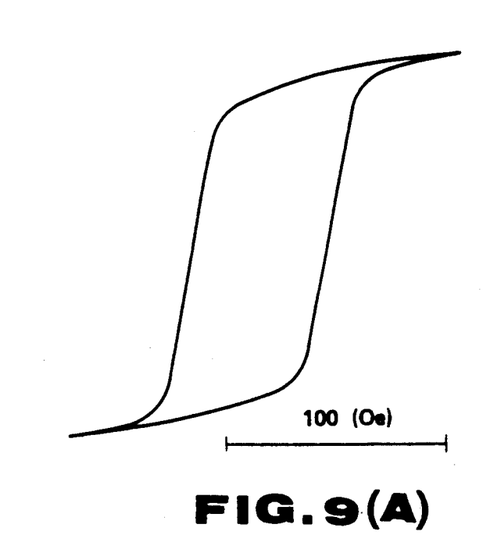
FIG. 9(A), (B) are characteristic diagrams showing hysteresis curves for the $Fe_{60}Co_{40}$ thin film, FIG. 9(A) showing the characteristics at the end of sputtering and FIG. 9(B) those at the end of annealing.
Figure 9B:
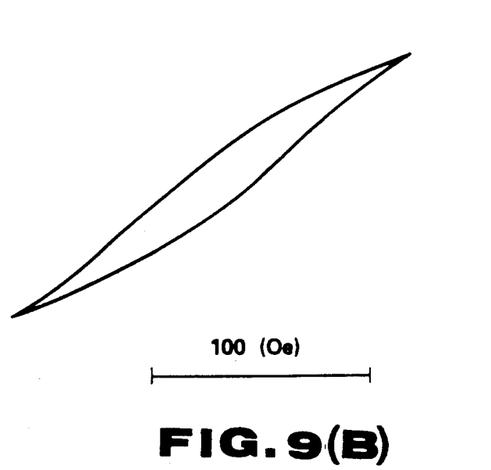

Considering first the $Fe_{60}Co_{40}$ thin film, as shown at FIG. 9(A), the saturation magnetic flux density at the end of sputtering is sufficiently high but the coercive force is larger. After annealing the film, as shown in FIG. 9(B), the coercive force is reduced, but the saturation magnetic flux density and the magnetic permeability are lowered so that the material is not suitable to usage as the core material for the magnetic head.

Figure 10A:
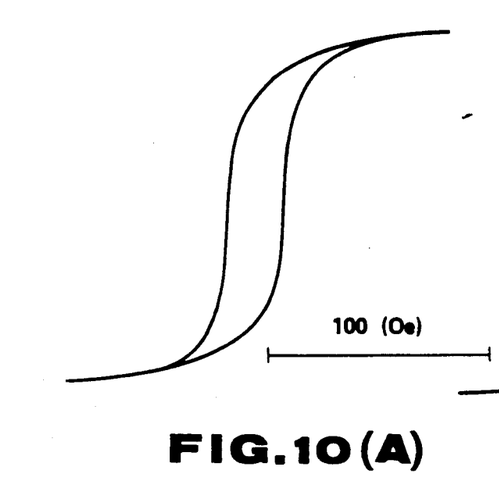
FIGS. 10(A) and 10(B) are characteristic diagrams showing hysteresis curves of the $Fe_{60}Co_{38}Dy_2$ thin film, FIG. 10(A) showing characteristics at the end of sputtering and FIG. 10(B) those at the end of annealing.

Considering the $Fe_{60}Co_{38}Dy_2$ thin film in which 2 atomic percent of Co in the above $Fe_{60}Co_{40}$ thin film is replaced by Dy, as shown in FIG. 10(A), it has been ascertained that the coercive force has been effectively reduced while the saturation magnetic flux density and the permeability were maintained at the end of the sputtering at the values that are substantially unchanged from those of the above $Fe_{60}Co_{40}$ thin film. After annealing the thin film, the coercive force was further improved, while the saturation magnetic flux density was maintained at a higher value, as may be seen from FIG. 10(B).

Figure 11A:
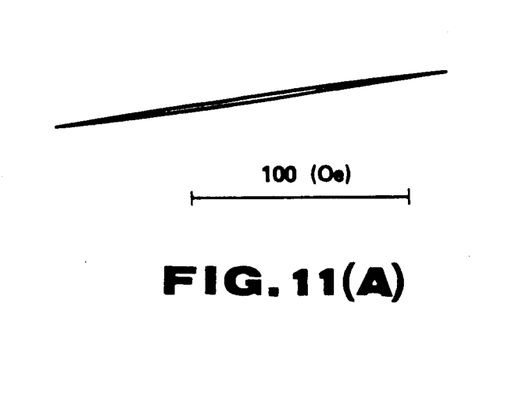
FIGS. 11(A) and 11(B) are characteristic diagrams showing hysteresis curves for the $Fe_{60}Co_{38}Sm_2$ thin films, FIG. 11(A) showing characteristics at the end of sputtering and FIG. 11(B) those at the end of annealing.
Figure 11B:
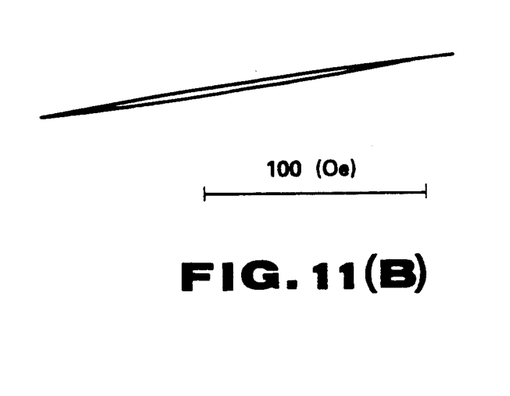

Considering the $Fe_{60}Co_{38}Sm_2$ thin film in which 2 atomic percent of Sm is added in place of Dy as comparative example, soft magnetic properties are not manifested after the end of sputtering or of annealing, as may be seen from FIGS. 11(A) and 11(B) so that it was found that the film can not be used as the magnetic material.

Since the effect of addition of Dy to the single layer film consisting of the FeCo alloy has become manifest, consideration was then made on a laminated film consisting of the FeCoDy thin film as the first soft magnetic thin film layer and the second soft magnetic thin film layer.

Figure 10B:
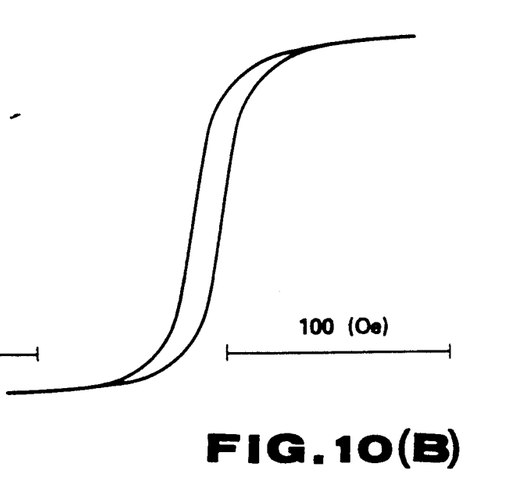
Figure 12:
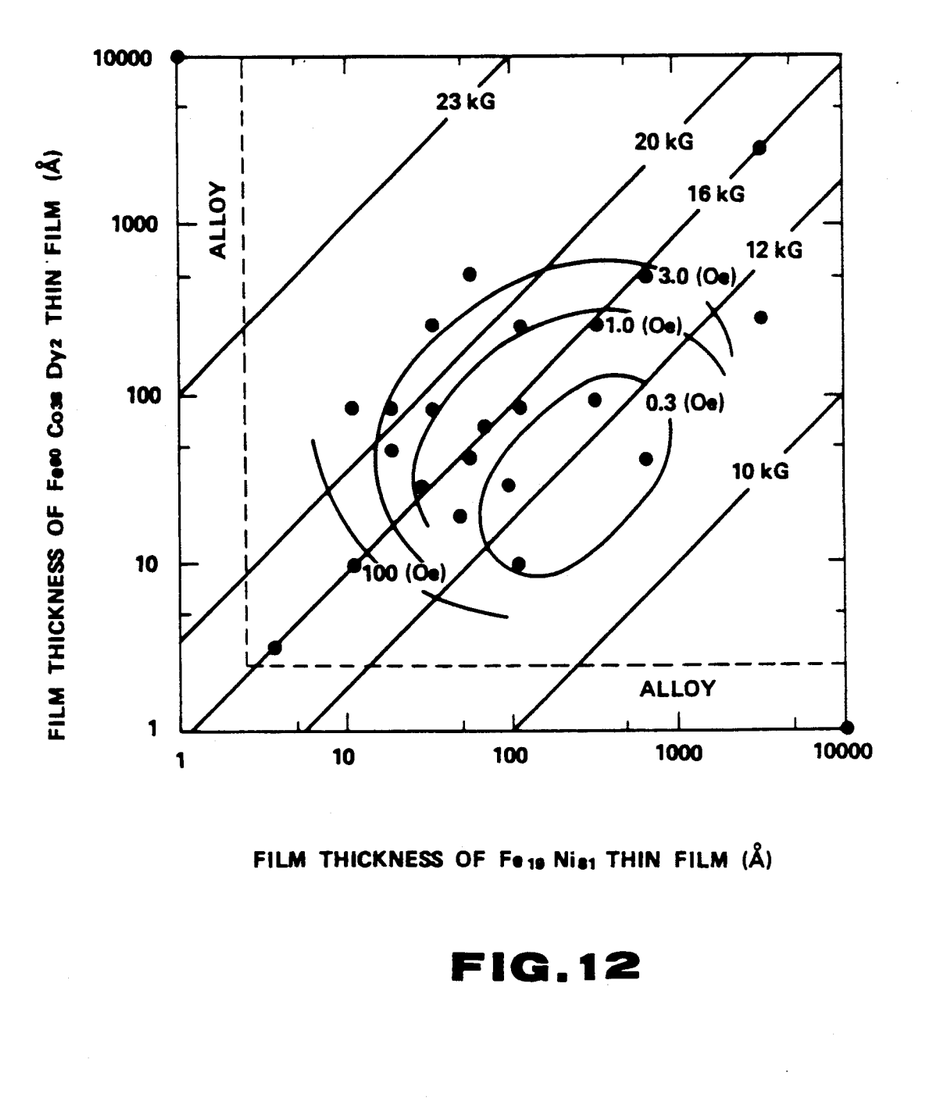
FIG. 12 is a characteristic diagram showing the film thickness dependency of the coercive force of the laminated $Fe_{60}Co_{38}Dy_2$ thin film and $Fe_{19}Ni_{81}$ thin film.

The coercive force at the end of the sputtering was then measured of the laminated film obtained upon laminating a first soft magnetic thin film layer having the composition of $Fe_{60}Co_{38}Dy_2$ and the second soft magnetic film layer having the composition of $Fe_{19}Ni_{81}$ with varying film thicknesses as in the example shown in FIGS. 10(A) and 10(B). The results are shown in FIG. 12. The gas pressure of 4 m Torr and the overall laminated film thickness of 3.6 microns were used for sputtering.

In this figure, the film thickness in Å of the $Fe_{60}Co_{38}Dy_2$ is plotted on the ordinate and the film thickness in Å of the $Fe_{19}Ni_{81}$ thin film is plotted on the abscissa. The L-shaped region surrounded by the dotted line and the both axes indicates that the laminated structure cannot be attained with the combination of the film thicknesses falling under this region because one thin film has a thickness sufficiently larger than the thickness of the other film, but substantially an alloy phase will be produced. The points in the drawing indicates the combination of measured film thicknesses of the laminated films and a solid live connecting these points substantially accurately is an equi-Hc line connecting the points of equal coercive force (Hc). The chain dotted line indicates and equi-Bc line connecting the points of equal saturation magnetic flux points (Bs).

It could be seen from this figure that the laminated films of the $Fe_{19}Ni_{81}$ thin film having larger film thicknesses than those of the $Fe_{60}Co_{38}Dy_2$ thin film generally exhibit a lower coercive force.

Figure 13:
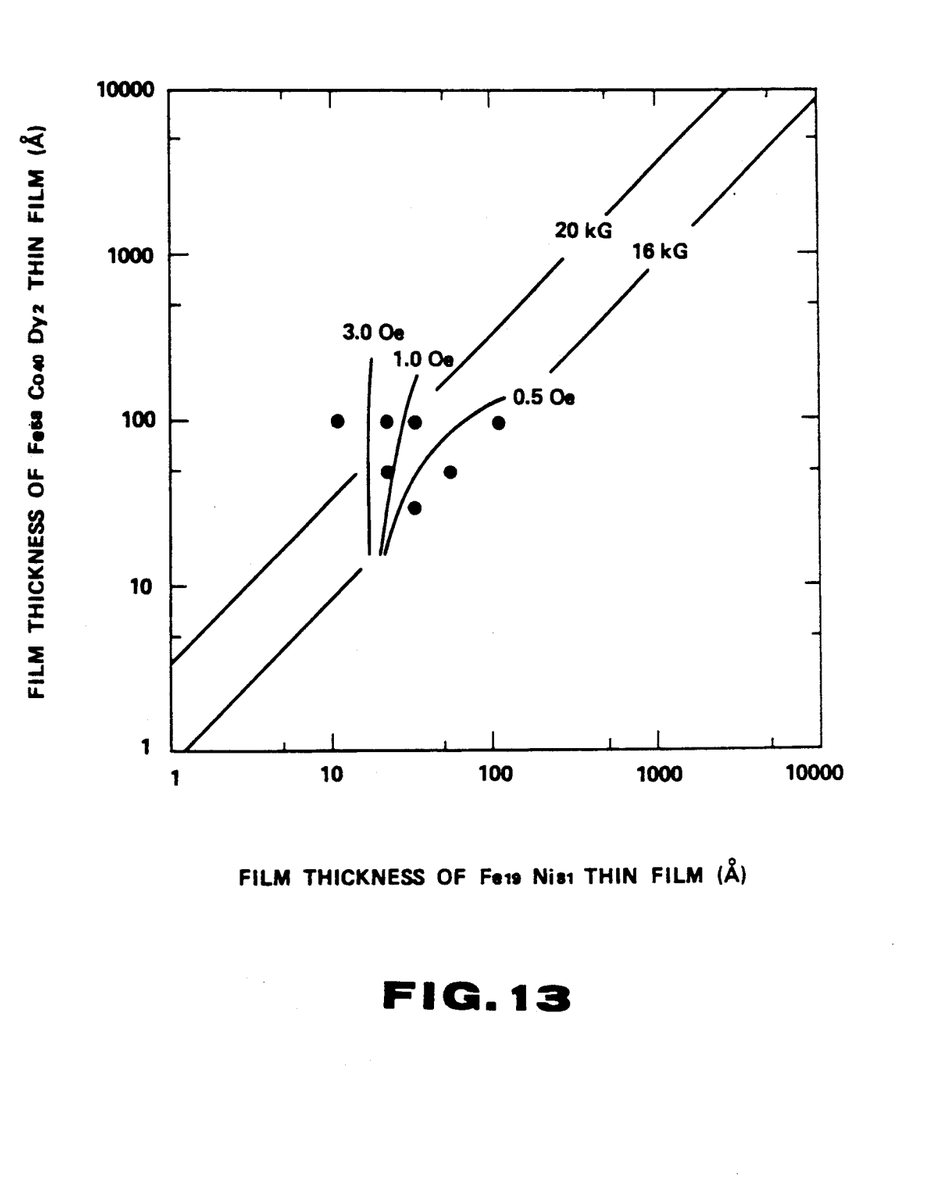
FIG. 13 is a characteristic diagram showing the film thickness dependency of the coercive force of the laminated $Fe_{58}Co_{40}Dy_2$ and $Fe_{19}Ni_{81}$ thin films.

The laminated films with the $Fe_{19}Ni_{81}$ of the $Fe_{58}Co_{40}Dy_2$ with a slightly different composition of Fe and Co from the aforementioned $Fe_{60}Co_{38}Dy_2$ thin film were prepared with varying film thickness and the coercive force at the end of sputtering was measured. The results are shown in FIG. 13. As sputtering conditions, 2.5 m Torr of the gas pressure and 1.8 microns of the total thickness of the laminated film were employed.

In this figure, the ordinate stands for the film thickness Å of the thin film of $Fe_{58}Co_{40}Dy_2$ and the abscissa the film thickness Å of the $Fe_{19}Ni_{81}$ film. The data entered therein are the same as those in FIG. 12.

From this figure, a tendency was observed in which the coercive force is low in the case of the substantially equal thicknesses of both films and the coercive force is increased with increase in the films thickness of the $Fe_{58}Co_{40}Dy_2$.

The example of laminating the FeCoDy base thin film with the FeNi base thin film has been explained with reference to FIGS. 12 and 13. Next, the example of laminating the FeCoNi base thin film in place of the FeNi base thin film as the second soft magnetic thin film layer has been considered. Thus the $Fe_{58}Co_{40}Dy_2$ thin film and the $Fe_{30}Co_{35}Ni_{35}$ thin film were laminated with variation in the combination of the film thicknesses and the coercive force was measured after sputtering. The results are show in FIG. 14. The gas pressure at the time of sputtering was 2.5 m Torr and the total thickness of the laminated films was 1.8 microns.

Figure 14:
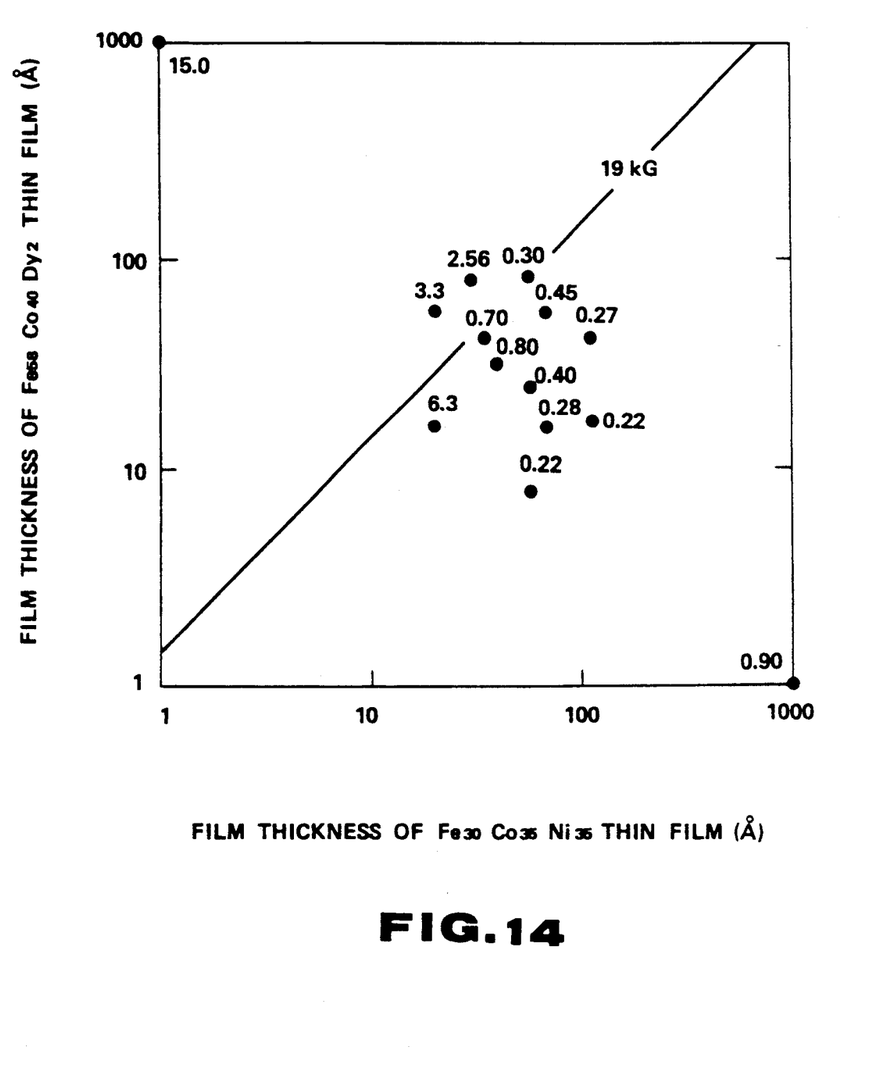
FIG. 14 is a characteristic diagram showing the film thickness dependency of the coercive force of the laminated $Fe_{58}Co_{40}Dy_2$ and $Fe_{30}Co_{35}Ni_{35}$ thin films.

In the drawing, the ordinate stands for the film thickness Å of the $Fe_{58}Co_{40}Dy_2$ thin film, while the abscissa the film thickness Å of the $Fe_{30}Co_{35}Ni_{35}$ thin film. The values of the coercive force are entered on top of the points indicating the combination of the film thicknesses. Although the systematic relation between the film thickness and the coercive force is not so clear as in FIGS. 12 and 13, it is seen from this figure that the soft magnetic thin film having a larger film thickness of the $Fe_{30}Co_{25}Ni_{45}$ thin film tends to be lower in the coercive force than the $Fe_{58}Co_{40}Dy_2$ thin film.

What is claimed is:

1. A soft magnetic thin film having a multi layered structure of alternately superposed 1st and 2nd magnetic thin films, wherein said first magnetic thin film having a face centered cubic structure and having a composition represented by the formula:

$$Fe_aCo_bNi_cM_d$$

wherein a, b, c and d represent the atomic percent of the elements and
$20 \leq a \leq 40$
$15 \leq b \leq 55$
$20 \leq c \leq 55$
$0 \leq d \leq 5$
$a+b+c+d=100$ and M is at least one element selected from the group consisting of Ti, Zr, V, Nb, Ta, Cr, Mo, W, B, C, Si, Al, Ge, Ga and said second magnetic thin film having a body centered cubic structure.

2. A soft magnetic thin film according to claim 1, wherein said second soft magnetic thin film is a FeSi alloy thin film.

3. A soft magnetic thin film which containing Fe and Co and 0.1 to 5 atomic percent by Dy having ythe structure FeCoDyM wherein M is chosen from the group consisting of Ti, Zr, V, Nb, Ta, Cr, Mo, W, B, C, Si, Al, Ge, and GA.

4. A soft magentifc thin film which comprises a lamination of a first soft magentic thin film layer constructed from a composition represented by the formula FeCoDyM wherein 0.1 to 5 atomic percent of the composition is Dy and M is chosen from the group consisting of Ti, Zr, V, Nb, Ta, Cr, Mo, W, B, C, Si, Al, Ge, and GA and a second soft magentic thin film layer having a face-centered cubic structure.

5. A soft magnetic thin film according to claim 4, wherein said second soft magentic thin film is at least any one of a FeNi alloy thin film and a FeCoNi alloy thin film.

* * * * *